No. 803,488. PATENTED OCT. 31, 1905.
J. HREN.
APPLYING STRIPS TO BOOKS, PAMPHLETS, PADS, &c.
APPLICATION FILED SEPT. 28, 1904.

5 SHEETS—SHEET 4.

WITNESSES:
William Miller
George Hulsberg

INVENTOR
Josef Hren
BY
W. C. Hauff
ATTORNEY

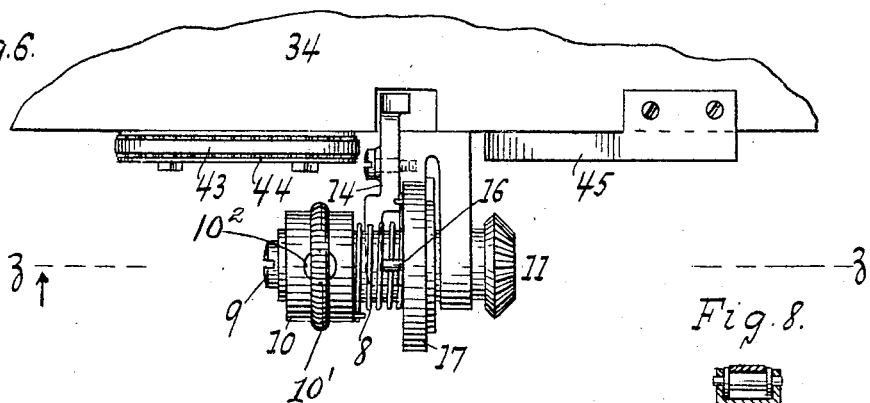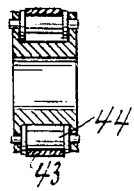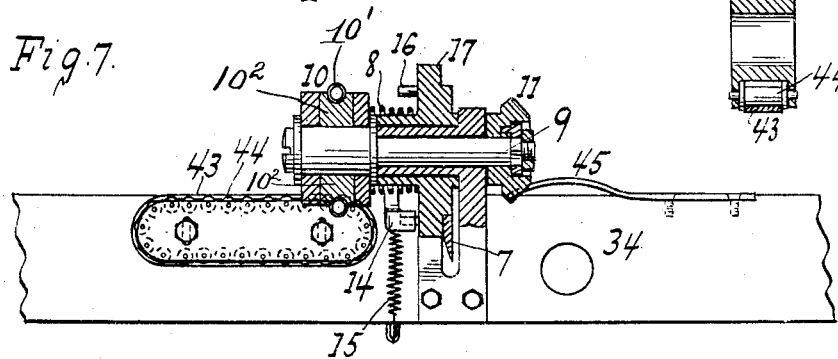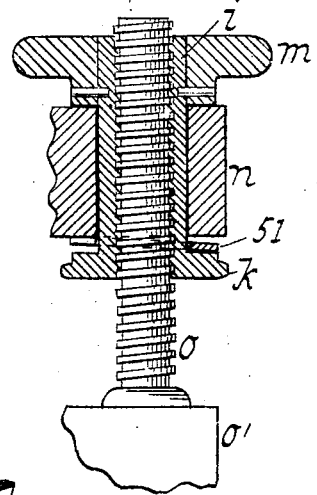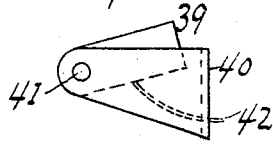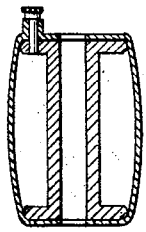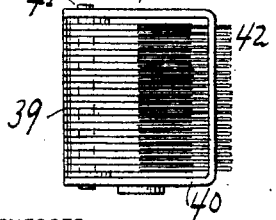

UNITED STATES PATENT OFFICE.

JOSEF HREN, OF BROOKLYN, NEW YORK.

APPLYING STRIPS TO BOOKS, PAMPHLETS, PADS, &c.

No. 803,488. Specification of Letters Patent. Patented Oct. 31, 1905.

Application filed September 28, 1904. Serial No. 226,406.

*To all whom it may concern:*

Be it known that I, JOSEF HREN, a citizen of the United States, residing at Brooklyn, in the county of Kings and State of New York, have invented new and useful Improvements in Applying Strips to Books, Pamphlets, Pads, and the Like, of which the following is a specification.

By means of this invention a strip or tape can be applied to a block or pad or to the back of a book or pamphlet. The strip can be of any suitable material, such as muslin, paper, or the like. Such strip or tape having been rendered adhesive is made to conform and adhere to the article and the strip having been trimmed or cut the backed or taped article is delivered.

The invention resides in the novel features of construction set forth in the following specification and claims and illustrated in the annexed drawings, in which—

Figure 1:
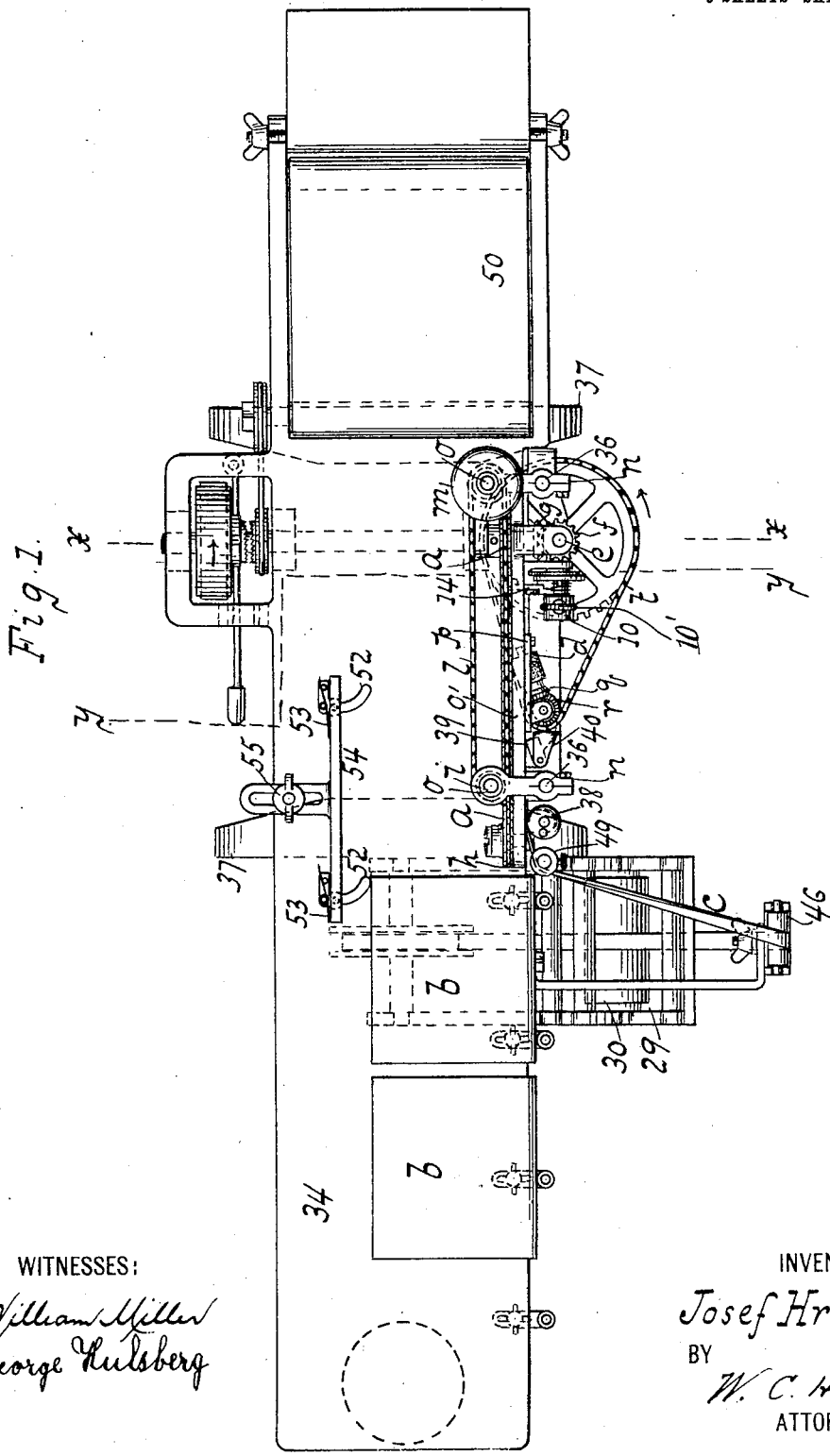
Figure 2:
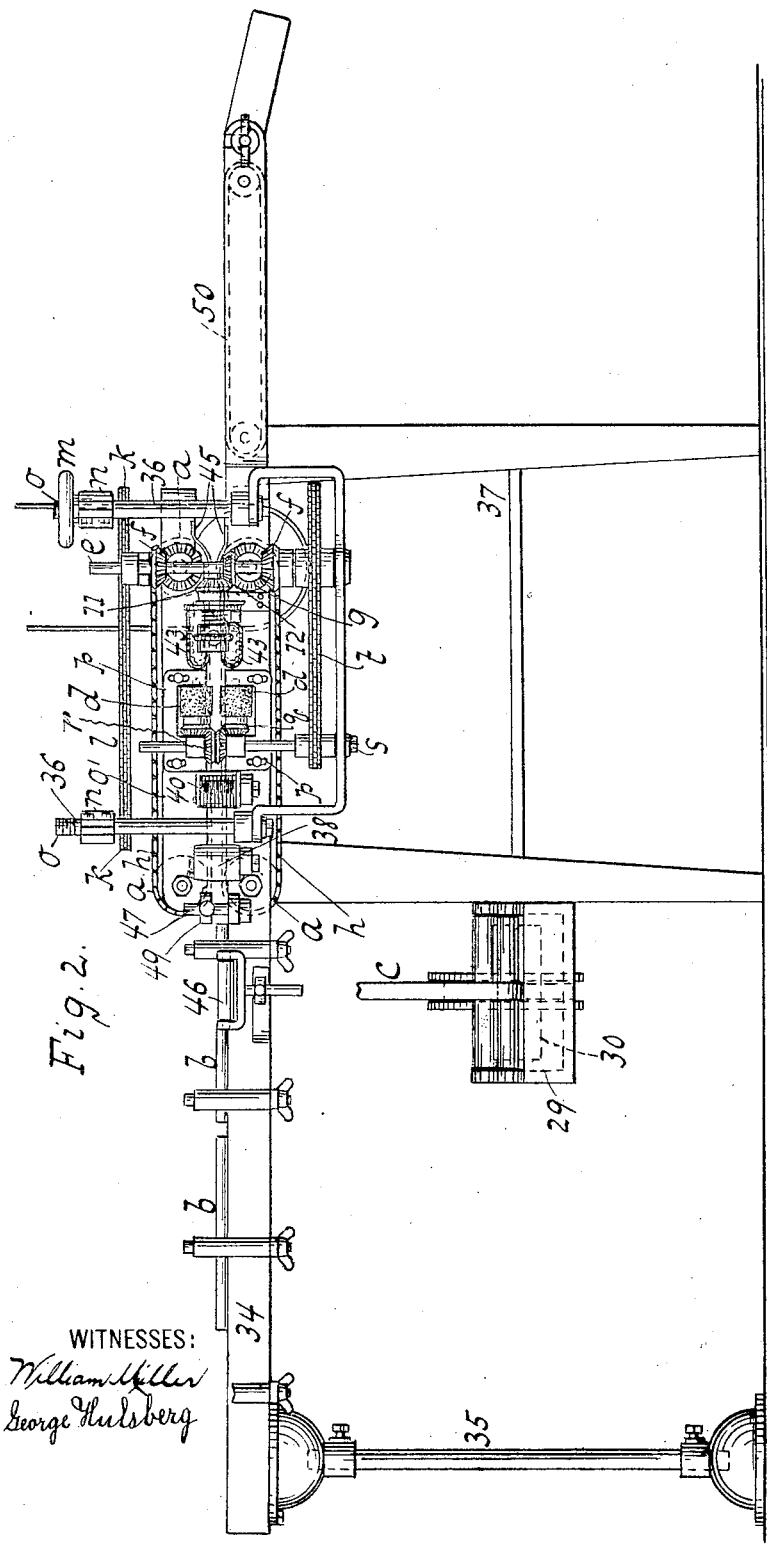
Figure 3:
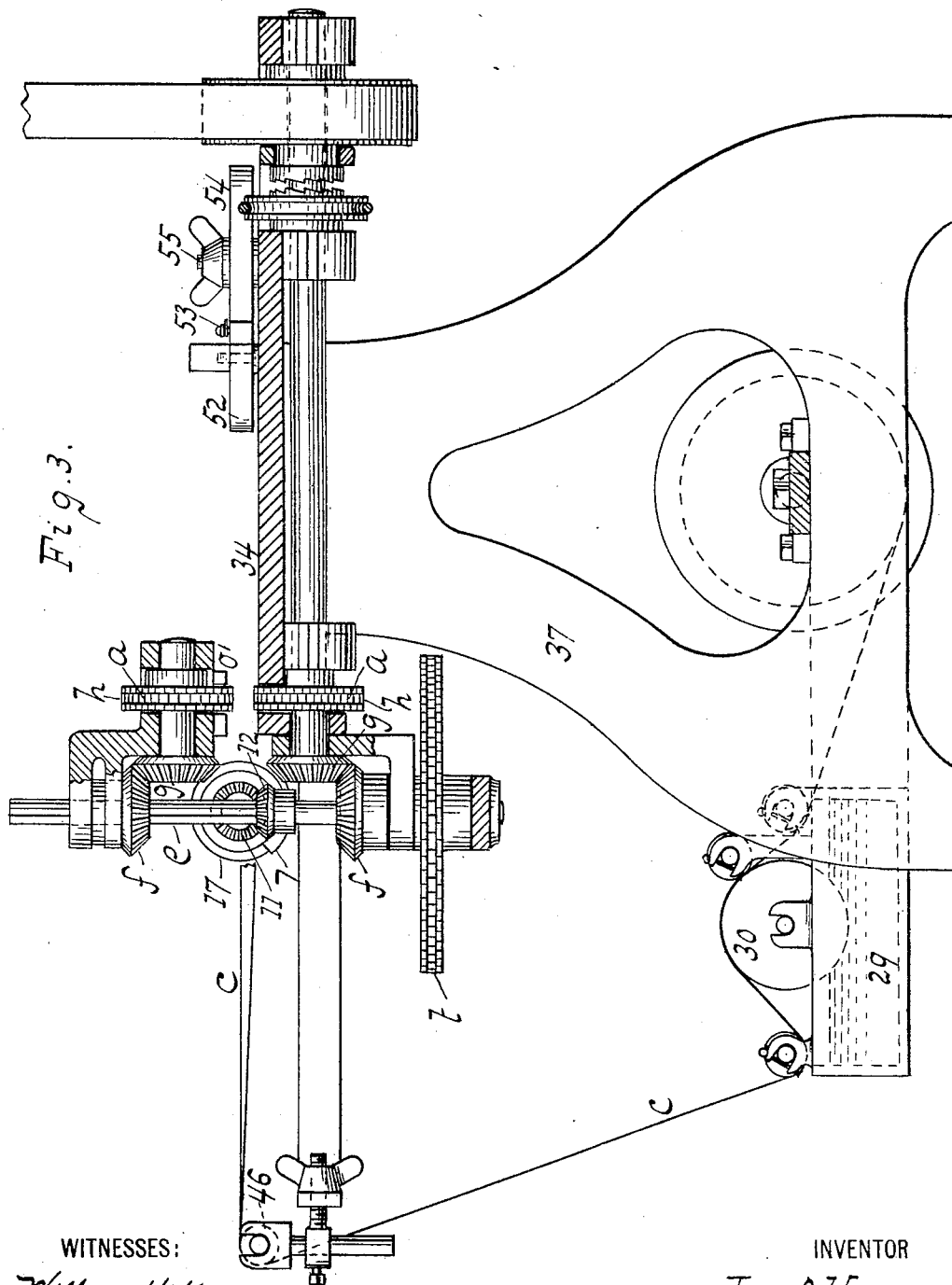
Figure 4:
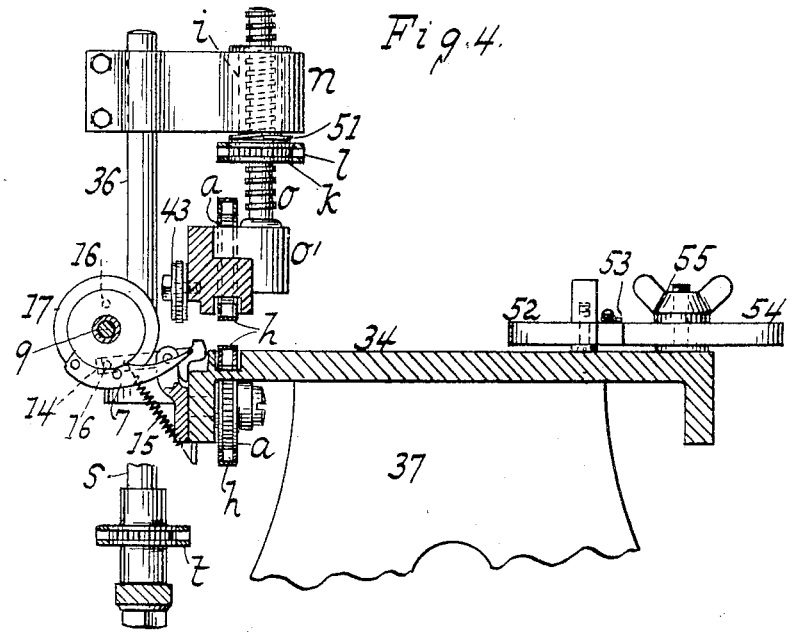
Figure 5:
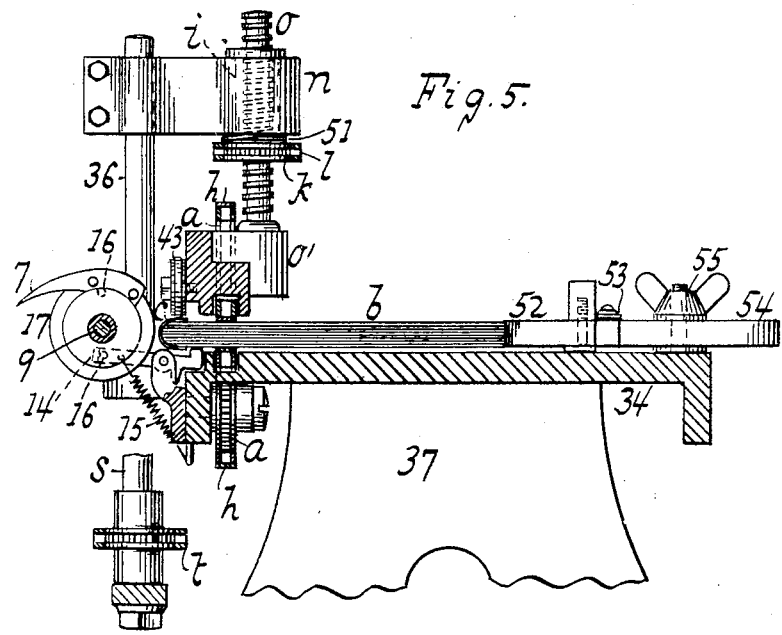

Figure 1 shows a plan view of a machine or device embodying this invention. Fig. 2 shows a side elevation of Fig. 1. Fig. 3 is a section along $x\,x$, Fig. 1. Fig. 4 is a section along $y\,y$, Fig. 1. Fig. 5 is a view like Fig. 4 with parts in a different position. Fig. 6 is a plan view of a knife or trimmer for severing a tape or strip. Fig. 7 is a section along $z\,z$, Fig. 6. Fig. 8 is a sectional view of antifriction bearing or rollers for a belt. Fig. 9 shows a tape-former. Fig. 10 is an edge view of Fig. 9. Fig. 11 shows a roller made yielding or pneumatic, so as to conform to the shape or back of a book or article when pressing a strip thereagainst. Fig. 12 shows an adjusting-screw for a feeding sprocket or chain. Fig. 13 shows a round book-back when taped or provided with a strip. Fig. 14 shows a square back taped or provided with a strip.

In the drawings are shown feed-rollers $a$ for feeding or moving a book $b$ or the like, to the back of which a strip or tape $c$ is to be applied by brushes $d$. This strip may be a previously-gummed strip which has been moistened or a freshly-gummed strip applied before the paste has dried. A shaft $e$ by gears $f$ engages gears $g$ of two oppositely-placed pairs of rollers $a$. These rollers are made in form of sprocket or chain wheels, about which run belts or chains $h$. The book being grasped between the upper and lower chains is carried along and the strip or tape $c$ applied, as presently explained. To prevent defacing or denting by the chains, the latter may have a soft or suitable covering of leather or other protecting or contact material.

The space between the feeding devices or chains can be varied for varying thicknesses of objects. One of the gears $f$ feathers on shaft $e$, so that as this chain or feeder is set from or toward the other the shaft retains its gear connection. In the drawings the upper chain or feeding mechanism is shown adjustable. This adjustment of this part of the feeding mechanism is attained by tapped sleeves $i$, Figs. 11 and 12, made to adjust or move uniformly by sprocket-wheels $k$, Figs. 2 and 4, and connection or chain $l$. One of the sleeves is shown with a handle or handwheel $m$. (Shown on larger scale in Fig. 12.) As these screws or sleeves are turned one way or another in arms or brackets $n$ the screws $o$, which support or form part of the block or bearing $o'$ of one set of rollers or sprockets $a$, are adjusted to or from the other set of sprockets or rollers. The arms or brackets $n$ are supported by posts 36, which rise from the table or feed-board or are supported on the frame or legs 37. This table or feed-board 34 can be leveled or adjusted to proper position by means of a leg 35, Fig. 2, shown with telescoping or adjustable sections. The upper chain being pressed by the book against the block $o'$ and the lower chain lying on the feed-table, such chains will be kept alined or parallel, so as to secure an extended grip along the flat faces or sides of a book cover or pad.

The brushes $d$ have their shafts supported by brackets $p$ and are rotated by gear $q$, engaging gear $r$ on shafts $s$. The gear $r$ of the brush on movable support $o'$, adjusted by screw $o$, feathers to accompany the adjustment the same as the feathering-gear $f$. The shaft $s$ is rotated by chain or connection $t$, extending to shaft $e$. The brushes $d$ are placed at an angle to the back of the book and rotate so as to brush or smooth the tape or strip to the sides or faces of the book or article.

The strip is shown pressed against the book-back by a roller 38, which can be more or less yielding to conform or make the strip conform to the book-back. A pneumatic or inflated roller, as shown in Fig. 11, has been tried and found to answer; but of course a brush-roller or other suitable device can be used without departing from the invention.

A tape-former was also applied to a device built according to this invention. Such tape-former was constructed of blades 39, Figs. 1, 2, 9, and 10, in a frame 40. Pivoted or swinging at 41 and pressed by springs 42 these blades or thin metal leaves press against the back of the book or article and also lap somewhat over the sides or covers. The blades have each an edge facing the book or article being backed. Swinging independently on pivot 41 and having each its individual spring pressing it toward the book such blades can clasp or conform a tape or strip in suitable manner.

Presser-belts 43, Figs. 7 and 8, are also shown running over guides or antifriction-rollers. These belts on antifriction-bearings aid in holding or pressing the strip to the book passing therebetween. In addition to these belts are shown presser-springs 45, which aid in pressing the strip or causing it to lie or adhere smoothly to the article. The upper one of the presser-belts 43 and presser-springs 45 are carried by the support $o'$, carried by screw $o$, to be adjustable therewith.

The books or articles coming from the feed-board are spaced by the operator placing a finger between each pair of books as they are moved along or by other suitable means, so that the continuous tape can be severed between such books, as presently explained.

The tape coming from a roll or supply is led over a roller 46 and then guided by a roller or stud 47, Fig. 2, at right angle to the preceding one, so as to be given a twist or present its adhesive side to the article. The roller 47 can have collars 49 adjustably arranged to accommodate varying width of strips. A take-off or delivery belt 50, suitably actuated, can carry off the completed or backed articles to a delivery-point.

In Figs. 4 and 12 a spring or flat spring disk 51 is shown between the bracket $n$ and the support $o$ or its sprocket-wheel $k$. Such spring allows a yield for variations such as occur in the thickness of some pads or books. Such yield has been found to be of advantage in a machine built according to this invention.

To aid or keep the books to proper alinement or register relative to the tape or strip, a guide or gage can be applied. A practical gage is obtained by fingers 52, Fig. 1, pressed by springs 53 and mounted or pivoted on a gage-bar 54, which can be suitably adjusted. A bolt or screw 55 of a screw-and-slot connection allows adjustment.

The knife is shown at Figs. 4, 5, and 7. The spring 8, Fig. 6, for actuating or rotating this knife-blade 7 is connected to shaft 9 by a friction-sleeve 10. Said sleeve has loosely mounted therein friction-plugs $10^2$, which are held by a spring-band $10'$ in contact with the shaft 9 or with the enlargement at one end of said shaft, said yielding engagement causing the requisite frictional contact of such plugs with the shaft to enable the springs 8 to be wound. The shaft 9 is rotated by gear connection 11 and 12, Fig. 2, actuated by shaft $e$. After the spring 8 has been wound to a certain tension the shaft 9 slips or rotates in the friction-block 10; but the knife is ready to be spun about by the spring 8 as soon as the detent or escapement 14, Fig. 4, is released.

The detent or lever has one arm held by spring 15 up above the level of table 34, Fig. 4, on which the book comes along. When the book depresses this lever or detent-arm, Fig. 5, the outer portion of the arm clears one of the studs 16, but comes into the path of the other, as these studs are sufficiently eccentric on disk 17. The spring can now snap or swing the knife about one-half of a turn, or from the position in Fig. 4 to that in Fig. 5. When the book has passed, the spring 15 returns detent to the position shown in Fig. 4 and the knife swings to rest at the starting position, with a stud 16 at rest against the detent until the latter is again actuated by a book pressing thereagainst.

What I claim as my invention, and desire to secure by Letters Patent, is—

1. A strip-applying machine comprising oppositely-located feeding mechanisms by which a book is fed, a gear-shaft for rotating the oppositely-placed feeding mechanisms and adjusting-screws for varying the space between the mechanisms, a knife, a knife-actuating spring which is put under tension by the gear-shaft, and a release for the knife.

2. A strip-applying machine comprising rollers between which the book is fed, a driving-shaft for the rollers, brushes for the strip, supports for the opposite ends of each brush, and driving means for the brushes.

3. A machine for applying a continuous strip to book-backs and comprising sprocket-wheels for feeding books, brushes for the strip, a knife, an actuating-spring for the knife, a shaft for driving the feeding sprocket-wheels and for winding the knife-actuating spring, and a detent for the knife to hold the latter against movement by the spring and means to move the detent to release the knife.

4. A strip-applying machine adapted for applying a continuous strip to book-backs and comprising two endless sprocket chains or belts between which the books are fed, brushes for the strip, a knife, a knife-actuating spring, a detent for the knife, a release for the detent for freeing the knife to cut the strip between the books, said release being in the path of the books to be actuated thereby, and connections whereby said spring is wound or put under tension by said chains.

5. A strip-applying machine comprising feeding chains and brushes, a strip-cutting knife, an actuating-spring for the knife, and a friction-collar for putting the spring under tension.

6. A strip-applying machine provided with spring pressers or guides adapted to contact with the front and back covers of a book or object in the machine, feeders for engaging the front and back covers of the book and an adjustable frame or supporting means for one of the spring pressers and feeders to enable the same to be simultaneously set to varying thicknesses of books.

7. A strip-applying machine having a pair of pressing-springs, a pair of feeding sprocket-chains with sprocket-wheels, a support for carrying one of the pressing springs and chains, and means for adjusting the support.

8. A strip-applying machine comprising a pair of suitably-spaced feeding-chains for directly engaging or grasping a book or the like, sprocket-wheels about which each chain is fed, a block extended along one of the chains to guide or keep it in alinement or prevent sagging, a feed-table over which passes the other chain to be kept against sagging and in parallel line with the preceding chain, a chain-driving shaft for a sprocket-wheel of each chain, gear connections between the shaft and sprocket-wheels, a brush-driving shaft, a pulley and belt connections between chain and brush driving shafts, brushes mounted respectively on the chain-guiding block and the feed-table, and gear connections between the brushes and their driving-shaft, said block being adjustable to vary the space between the chains and brushes, and the actuating-gears for these adjustable parts being feathered or slidable on their shafts to maintain operative connection between the shafts and the adjustable chain and brush.

9. A strip-applying machine comprising book and strip feeding mechanism, a clutch member actuated by the feeding mechanism, a knife-driving spring put under tension by the clutch, a knife connected with the knife-driving spring and a detent actuated by the book to release the knife for actuation by its spring at suitable intervals.

10. A strip-applying machine comprising oppositely-located book-feeding sprocket wheels and chains, pressing and brushing mechanism for the strip, a strip-cutter, a block or bearing with supporting-screws for one set of sprocket-wheels, adjusting or leveling nuts for the screws, a sprocket wheel and chain connection for the screws and an actuating or hand wheel or mechanism for one of the screws, said book-feeding wheels and chains being located on each side of the path of the books whereby they are made to grasp a book to feed the same.

11. A strip-applying machine comprising feeding-chains and sprocket-wheels with strip applying and cutting mechanism, supporting-screws for the sprocket-wheels, adjusting-thimbles for the screws, and a connecting-chain and sprockets for the thimbles so that the same can be rotated in unison to evenly or uniformly adjust the wheels, said book-feeding wheels and chains being located on each side of the path of the books whereby they are made to grasp a book to feed the same.

12. A strip-applying machine having a book-feeding sprocket chain and wheels, supporting-screws for the wheels, adjusting-thimbles made to surround and support the screws, brackets in which the thimbles can rotate and move rectilinearly, and springs interposed between the brackets and thimbles to allow the latter with the sprocket wheels and chains to give for a varying thickness of book.

13. A strip-applying machine having a feeding-chain and sprocket-wheels, adjusting-screws for the wheels and from which the same are suspended, thimbles for the screws, a support in which the thimbles are rotatively mounted, and a spring interposed between the thimble and its support to allow yielding or give for a varying thickness of book.

14. A strip-applying machine provided with strip-pressing belts and springs, book-feeding chains extended parallel to the belts, a common support or block for one of the belts and chains, and adjusting means for said support.

15. A strip-applying machine provided with strip-pressing belts and strip-pressing springs made to extend beyond the belt in line therewith to engage the object on leaving the belts, book-feeding chains extended parallel to the belts, and means for actuating the chains to feed a book with its back between the belts and springs.

16. A strip-applying machine provided with a strip or tape former composed of a series of spring-pressed yielding blades, a common pivot for said blades, a separate pressure-spring for each blade, and a frame forming a bearing for the pivot.

17. A strip-applying machine provided with a strip or tape former comprising a housing or support, a series of independently-swinging blades in the support, a common pivot for the blades extending through the support, and springs for pressing the blades to the strip or book.

18. A strip-applying or backing machine having feeding mechanism and strip smoothing or applying brushes supported at each end and placed at an angle to the back and made to rotate in contact with the faces or covers to cause the strip or tape to adhere or lie smoothly thereon the supports for one of the brushes comprising a bearing, adjusting-screws from which the bearing is suspended to be adjustable thereby, and sprocket-wheels and a chain for connecting the screws to cause the same to rotate in unison for uniform adjustment.

In testimony whereof I have hereunto set my hand in the presence of two subscribing witnesses.

JOSEF HREN.

Witnesses:
  GEORGE HULSBERG,
  EDWARD WIESNER.